United States Patent [19]

Cheng et al.

[11] Patent Number: 5,073,525

[45] Date of Patent: Dec. 17, 1991

[54] LIGHTWEIGHT TUNDISH REFRACTORY COMPOSITION

[75] Inventors: Jung-Jen A. Cheng, Easton, Pa.; Wilfred A. Martinez, Annandale; Amy P. Hale, Glen Gardner, both of N.J.

[73] Assignee: Quigley Company, Inc., New York, N.Y.

[21] Appl. No.: 425,633

[22] Filed: Oct. 23, 1989

[51] Int. Cl.$^5$ .................... C04B 38/06; C04B 35/02; C04B 35/14

[52] U.S. Cl. ........................... 501/81; 501/80; 501/95; 501/109; 501/123; 501/133; 501/127

[58] Field of Search ............ 501/81, 95, 109, 94, 501/80, 81, 83, 109, 123, 125, 153, 104, 105; 264/44

[56] References Cited

U.S. PATENT DOCUMENTS

| | | | |
|---|---|---|---|
| 2,553,759 | 5/1951 | Geiger et al. | 25/156 |
| 3,839,059 | 10/1974 | Rothfelder et al. | 106/115 |
| 3,894,572 | 7/1975 | Moore, Jr. | 164/26 |
| 4,276,091 | 6/1981 | Cassens, Jr. | 106/58 |
| 4,307,051 | 12/1981 | Sargeant et al. | 264/53 |
| 4,600,560 | 7/1986 | Vallak | 422/41 |
| 4,654,314 | 3/1987 | Takagi et al. | 501/82 |
| 4,683,019 | 7/1987 | Motoki | 156/293 |
| 4,751,204 | 6/1988 | Kyoden et al. | 501/89 |
| 4,778,526 | 10/1988 | Cassens, Jr. | 106/77 |
| 4,812,428 | 3/1989 | Kohot | 501/148 |
| 4,833,109 | 5/1989 | Macey et al. | 501/120 |
| 4,843,044 | 6/1989 | Neville et al. | 501/111 |

FOREIGN PATENT DOCUMENTS 1223001 2/1971 United Kingdom ................ 501/81

*Primary Examiner*—Mark L. Bell
*Assistant Examiner*—Alan Wright
*Attorney, Agent, or Firm*—Peter C. Richardson; Lawrence C. Akers; Howard R. Jaeger

[57] ABSTRACT

Lightweight, low density magnesia-based tundish refractory compositions containing from 0.01 to 2.00 weight percent styrofoam beads and up to 5.0 weight percent paper fiber are disclosed. The compositions have excellent rapid heating, thermal insulative, vertical adhesion and deskullability properties. The compositions are useful as a lining applied over the permanent lining of a tundish, such as is used in continuous molten metal casting processes.

27 Claims, No Drawings

५,०७३,५२५

LIGHTWEIGHT TUNDISH REFRACTORY COMPOSITION

FIELD OF THE INVENTION

This invention relates to refractory compositions, particularly those having a high magnesia content. The invention further relates to refractory compositions which are useful for forming the wearable, disposable monolithic lining which coats the permanent lining of a tundish used in continuous molten metal casting processes. The invention still further relates to refractory compositions which can be applied either by gunning, spraying, or trowelling.

BACKGROUND OF THE INVENTION

A tundish is a large intermediate holding vessel for molten metal used in continuous casting processes, such as the continuous casting of steel. The tundish is, in effect, an intermediate process reservoir which receives a large quantity of molten metal from conveying ladles exiting a furnace in which actual melting of the ore occurs, and which then transfers the molten metal to a casting mold. A system of inlet and outlet nozzles controls the flow of molten metal into and out of the tundish.

The tundish itself is generally a steel vessel which is lined with several layers of a refractory composition. A permanent lining, generally of refractory brick, serves as an inner lining to protect the vessel. The permanent lining, in turn, is coated with a wearable and disposable lining, generally of a refractory composition which has been applied to the permanent lining by gunning, spraying or trowelling. The disposable lining is in direct contact with the molten metal in the tundish and protects the permanent lining from exposure to the molten metal.

During the casting process, some molten metal remains in the tundish and solidifies on the lining. The disposable lining itself can become cracked, or spalled and/or some of it may break away leaving the permanent lining exposed to molten metal. This type of damage to the disposable lining is due to expansion of the refractory material, caused by uneven thermal forces on it as it comes in contact with the molten metal, and by abrasive contact with the molten metal.

Periodically, the supply of molten metal in the tundish is not refilled from the ladles and the reservoir of molten metal is allowed to deplete by filling molds until the tundish is empty, so that the tundish can be removed from service for maintenance. Solidified metal adhering to the disposable lining, known as "skull", is first removed by scraping and chisselling it away. This sometimes causes further damage to the surface of the disposable lining over and above any damage caused by the molten metal during operation. The disposable lining is then repaired by gunning, spraying or trowelling additional refractory composition onto the damaged portions, before the tundish is returned into service Occasionally, damage to the disposable lining may be severe, or the time may have come in a routine cycle of operation after several interim repairs that the entire disposable lining is removed down to the permanent lining and the tundish is completely re-lined with disposable lining refractory composition by gunning, spraying or trowelling it on.

Ideally, the disposable lining material is a refractory which is lightweight, but strong, has good rapid heating properties during curing after application and is resistant to cracking, spalling and thermal and structural stresses during operation of the tundish. The material must be capable of expansion without a significant reduction in strength. The material should also be capable of complete removal from the tundish when complete relining is desired.

Refractory materials having a high magnesia (MgO) content have traditionally been used as the disposable lining material.

Magnesia-based coating refractories, alone, however, have a high thermal expansion. This can lead to a problem known as "bulging", in which the disposable lining separates away from the underlying permanent lining as the disposable lining expands during heating. This problem has previously been overcome by the inclusion of a plasticizer and a binder in the refractory composition. The use of a plasticizer has been observed to increase the refractory's ability to adhere to a surface to which it is applied, while a binder increases the composition's lateral strength characteristics and ability to withstand forces acting perpendicularly against it.

Refractory compositions having too high a moisture content are susceptible to explosive spalling during curing and drying after application. This is caused during the heat-up of recently applied refractory composition to dry and cure it, by the vaporization of the retained moisture in the refractory accompanied by a buildup of steam pressure in the layers, followed by the sudden explosive fracturing or chipping away of some of the refractory layer as the pressure is relieved.

In order to overcome the problem of explosive spalling, it has heretofore been known to mix certain ingredients with the refractory aggregate base to impart to the refractory composition a porous state over and above the naturally occurring porosity of the refractory aggregate material, thereby allowing moisture vapor to vent, and preventing the buildup of pressure in the refractory layer which causes the explosive spalling. Materials added to fulfill this function have previously included mineral fibers such as glass wool and asbestos, and various hollow-core aggregates.

SUMMARY OF THE INVENTION

We have discovered that the properties of a refractory material suitable for use as the material of a disposable lining for a tundish are significantly improved in a composition wherein the principal component is a refractory aggregate such as magnesia, alumina, calcia, silica or combinations of the above materials, by the addition of an amount of void forming material, such as styrofoam beads made from expanded polystyrene beads and preferably in combination with an amount of paper fiber In particular, we have discovered that optimum properties are imparted to a refractory composition for forming the disposable lining of a tundish and the like when the porosity introduced into the composition is of a certain amount and type, for which the criteria are satisfied by the use of styrofoam beads, preferably in combination with paper fiber. The optimum disposable tundish lining refractory composition further includes a binder which binds with the principal refractory material and gives it greater strength; a plasticizer which enhances adherence of the composition when applied to the permanent refractory lining; a bond stabilizer; a homogenizer; a wetting agent; and optionally, in certain situations, a small amount of a wetting/foaming agent.

Refractory compositions prepared according to the present invention have been found to have excellent rapid heating properties. They are lightweight and have a low density. The material is applied by gunning, spraying or trowelling it on, and it exhibits excellent adhesion to vertical surfaces when applied at the proper consistency. When applied as a protective lining to a tundish on top of a permanent lining, materials of the present invention demonstrate excellent thermal insulative properties, which prolongs the permanent lining life and reduces the chilling effect on molten steel poured into the tundish. Moreover, due to the low density of the present refractory material, less material needs to be applied to a tundish than is required with previously available disposable tundish linings. The present material also exhibits excellent deskullability properties which reduces the turn-around time for reuse of the tundish. The present material has a high durability and causes little or no marring of the tundish permanent lining surface to which it is applied.

DETAILED DESCRIPTION OF THE INVENTION

In accordance with the present invention, a refractory composition for use as a disposable liner for a tundish includes, as a principal component, a refractory agrregate material selected from the group consisting of magnesia, alumina, calcia, silica, and combinations thereof; from about 0.01 to about 2.0 weight percent of styrofoam beads, together with up to about 5.0 weight percent of a homogenizer in the form of paper fiber; and further contains up to about 6.0 weight percent of a binder, which binds with the refractory material, the binder being selected from the group consisting of alkali metal silicates, alkali metal phosphates, and combinations thereof, with sodium silicate, monosodium phosphate, and sodium phosphate being preferred; up to about 10.0 weight percent of a plasticizer, which enhances the ability of the composition to adhere to the surface to which it is applied, the plasticizer being a clay, such as bentonite or ball clay; up to about 5.0 weight percent of a bond stabilizer, the bond stabilizer being at least one of an organic acid, preferably an aliphatic di- or tri- carboxylic acid, more preferably, an organic acid selected from the group consisting of tartaric, citric, oxalic, and malic acids, and mixtures thereof, and an alkali metal sulfate, preferably sodium sulfate; and up to about 1.0 weight percent of a wetting agent, preferably a poly-oxyethylene alkylate ether, most preferably selected from the group consisting of methyl cellulose and carboxy methyl cellulose. The balance of the composition, adding up to 100.0 weight percent, is the refractory aggregate base material. For trowellable compositions, the addition of a small amount of a foaming/wetting agent, such a sodium lauryl sulfate is also desirable.

The overall range of refractory compositions encompassed by this invention is:

| Component | Weight Percent |
| --- | --- |
| Refractory Material | Balance |
| Styrofoam Beads | 0.01–2.0 |
| Homogenizer (Paper Fiber) | 0–5.0 |
| Binder | 0–6.0 |
| Plasticizer | 0–10.0 |
| Stabilizer | 0–5.0 |
| Wetting Agent | 0–1.0 |
| Foaming Agent | 0–0.5 |

In order to prevent the occurrence of spalling in refractory compositions, both during the drying and curing stage which follows application of the composition to a vessel, such as a tundish, and while in service, it has been found that the refractory composition must contain both the right amount and type of total porosity or void space. The drying and curing of freshly applied refractory composition, which has an insufficient amount of and/or the wrong type of voids can result in a severe form of spalling, known as explosive spalling, which is attributable to the relatively high moisture content of fresh, uncured refractory. Explosive spalling occurs when freshly applied refractory is heated to dry and cure the material, and moisture in the interior of a layer of the refractory begins to vaporize If there are insufficient voids of a variety known as channel-type voids in the refractory, the vaporized moisture is unable to escape to the surface where it is vented away, and instead causes the outer surface of the refractory to bulge in spots due to the build-up of steam pressure from the water vapor. Channel-type voids are of an interconnecting passageway nature and extend throughout the layer of refractory, from the inner depths of a layer of the composition to its outer surface. Eventually, the built-up steam pressure exceeds the mechanical strength of the refractory and causes the material in that spot to forcibly detach itself from the bulk of the refractory layer. This leaves spots of diminished refractory thickness, which adversely affects the thermal behavior of the refractory lined vessel when placed in high temperature service. Thus, for example, in a tundish in which the refractory material of the disposable lining is severely spalled, the disposable lining is unable to provide sufficient insulating effect to protect the permanent lining from high temperature thermal stress damage when a molten material is poured into the tundish, thereby shortening the operational life of the permanent lining and resulting in excessive, non-routine down time for the vessel.

Spalling may still occur during regular high temperature operation of a refractory lined vessel, and while it is usually not as serve as the explosive spalling which occurs during drying and curing of freshly applied refractory, due to the significantly lower moisture content of the refractory material, it may nevertheless become significant enough to cause operational problems and reduce the service life of the unit.

It has been discovered that the problem of spalling in refractory compositions is prevented or substantially reduced and the desired type of additional porosity is introduced into a refractory composition by the provision of a combination of styrofoam beads expanded from polystyrene beads as a filler material, and paper fiber as a homogenizer. When proper levels of these ingredients are mixed with the refractory aggregate, and the styrofoam beads and paper fiber are subsequently burned-off during the drying and curing of the refractory, following its application, the desired amount of channel-type voids are created in the material.

It has been found that effective refractory compositions are prepared according to the present invention wherein the styrofoam bead content is from about 0.01 to about 2.0 weight percent of the total composition. Optimum styrofoam bead levels have been found to exist at around 0.2 weight percent for trowellable compositions and at around 0.5 weight percent for gunnable and sprayable compositions. These values are at corresponding optimum paper fiber content levels, as described below. At a styrofoam bead content of 0.5 weight percent, the styrofoam beads account for approximately ⅛ of the total volume of the material.

Two types of styrofoam beads, differing only in their particle size distribution have been found to work particularly well in the refractory compositions of the present invention. Both types of styrofoam beads have a bulk density of 1.35 lbs/ft$^3$, a melting point of about 460° F. and a vaporization temperature of about 540° F. As defined herein, Type #1 beads have a coarse particle size, with particle sizes ranging from about 1.2 mm to about 3.0 mm, while Type #2 beads have a fine particle size, with particle sizes ranging from about 0.6 to about 1.2 mm.

Although the use of styrofoam beads alone can result in formation of the desired amount and type of voids, the weight of styrofoam beads required to achieve the desired void space is so high as to cause an undersirable reduction in the mechanical strength properties of the refractory compositon.

At lower amounts, at which the mechanical properties of the refractory are not affected, the use of styrofoam beads alone can provide only a part of the optimum total void space, and the type of voids that result from use of the styrofoam beads alone is generally of a less effective, discrete type rather than the desirable channel type. Styrofoam beads burn-away to leave individual, not interconnected, spherical type voids in the refractory. Discrete voids remain separate as the filler material which occupied their space is burned away. This is in contrast to the much preferred channel type voids, in which individual void spaces, caused by burnout of the styrofoam bead filler and paper fiber filler-homogenizer, link-up with each other and with naturally occurring voids in the refractory aggregate base material to form actual continuous channels extending deep into the layer of refractory. It is through these channels that vaporizing moisture escapes from the refractory composition as it is being heated up to be dried and cured. The water vapor is safely vented at the surface of the refractory layer where the channel outlets terminate, thereby preventing the occurrence of explosive spalling.

The further addition of paper fiber to refractory compositions containing styrofoam beads has been found to enable the formation of the optimum amount and type of void spaces in the refractory at total levels of those components, measured as weight percents of the total refractory composition, which do not adversely affect the mechanical properties of the refractory.

A broad spectrum of textures of paper fiber from coarse to fine can be utilized in the refractory compositions of the present invention. Within the overall limits of the ranges of weight percents of each of the styrofoam bead and paper fiber components, the amount of each component can be varied to result in a refractory composition which contains a specified total amount of channel type voids and has the desired physical properties for a specific type of application. As the weight percent of styrofoam beads is increased, the paper fiber content can be decreased to maintain the same overall properties. At a constant level of styrofoam bead content, it is necessary to utilize a greater weight percent of fine grade paper fiber having short length fibers to replace a given amount of coarse paper fiber with large fiber lengths to produre the same amount of channeling.

As used herein, fine paper fiber refers to paper fiber having lengths of from about 0.1 mm to about 0.5 mm, with an average length of about 0.3 mm, and coarse paper fiber refers to paper fiber having lengths of from about 1.0 mm to about 1.5 mm, with an average length of about 1.25 mm.

It is preferred to use coarse paper fiber in the refractory compositions of the present invention.

It has been found that effective refractory compositions can be prepared according to the present invention wherein the paper fiber content is up to about 5.0 weight percent of the total refractory composition. Optimum paper fiber content, using coarse paper fiber, has been found to exist at about 0.8 weight percent of the total composition of trowellable compositions and at around 1.0 weight percent of the total composition for gunnable and sprayable compositions. These values are at the optimum styrofoam bead content levels mentioned above. In combination, these represent optimum levels for each of the styrofoam beads and paper fiber to produce refractory compositions with the desired amount and type of void spaces.

The actual mechanism for production of the desired channel type voids in the refractory compositions is by burnout of the styrofoam beads and paper fiber from the refractory composition as it is heated up and cured after application. When the total weight of styrofoam beads and paper fiber in the refractory composition is such that molecules of styrofoam and/or paper fiber are substantially contiguous to one another or to naturally occurring void spaces in the refractory base material (magnesia, alumina, calcia, silica, etc.), continuous channel type voids are produced in the refractory when the styrofoam beads and paper fiber are burned away. The paper fiber is the first to reach its ignition point and burns away. As the temperature continues to increase, the styrofoam beads begin to melt and ultimately vaporize. The resulting gases from the burned paper fiber and vaporized styrofoam beads escape from the refractory composition through the channel-type voids to the surface layer of the composition where they dissipate.

Refractory compositions made according to the present invention are capable of being applied by all three most widely used conventional means, including gunning, spraying and trowelling.

Both gunnable and sprayable refractories are applied using a "gun" type device consisting of a nozzle with a trigger to control the flow of material. The only difference between the gunnable and sprayable modes of application is the way in which the dry refractory mixture is mixed with water and supplied via hoses to the gun for application to a surface.

In a gunnable refractory composition, the dry mix of all ingredients is propelled through a hose by an air jet to the gun. As the dry mix exits the gun nozzle, it is mixed with water and the saturated wet mixture is ejected from the gun nozzle by back air pressure.

In a sprayable refractory composition, the dry mix is first mixed with water and is pumped through a hose in the wet state to the gun. As the wet mix enters the gun, it is mixed with a high pressure air jet and ejected under pressure from the gun nozzle exit.

Trowellable refractory is manually applied to a surface with a trowel or similar tool.

The principal difference amount the three types of refractory compositions is their consistency at time of application, which affects their adherence properties. Gunnable and sprayable compositions must not have too watery a consistency upon application, or else they will not adhere properly and will tend to run. Sprayable compositions cannot be too thick otherwise they will clog the hose and gun nozzle. Trowellable compositions similarly, cannot be too watery or they will also not adhere to the applied surfaces properly and will run. If trowellable compositions are too thick, they tend to stick to everything, including the mixing vessel and application trowel and cannot be easily applied.

Consistency of gunnable and sprayable compositons is more readily controlled by regulating the amount of water added to the dry mix as it is being gunned on in the case of gunnable compositions and by monitoring the flow properties of the wet mix through the hose to the nozzle in the case of sprayable compositions.

Trowellable compositons are generally prepared on a batch basis, rather than by a continuous mixing and application process as is used for gunnable and sprayable compositions. It has been found that the consistency of trowellable compositions can be better controlled by the addition of a small quantity of a wetting/foaming agent to the mixture This minimizes the possibility that too much water will be added to a batch of the dry mix rendering it too runny. Moreover, if too little water is added to a batch, the wetting agent gives the mixture smoothness and ease of applicability and prevents the compositon from sticking to everything. Sodium lauryl sulfate has been found to act as a preferred wetting-/foaming agent.

The addition of a foaming/wetting agent such as sodium lauryl sulfate, to trowellable compositions is in additon to the use of a poly-oxyethylene alkylate ether wetting agent, used in all compositions of the invention. Although the sodium lauryl sulfate acts as a foaming agent, its function in trowellable compositions is predominantly as a wetting agent to make the compositon more plastic and easier to apply at minimal moisture content. As a foaming agent, the sodium lauryl sulfate creates a certain amount of additional voids in the composition when mixed in. The voids created by the foaming agent, are however, unstable and are created or redistributed simply by stirring of the mixture. Thus, such voids cannot be depended upon to provide any of the overall void fraction in the ultimate composition, such as the channel voids created by burnout of the styrofoam beads and paper fiber content of the composition. The styrofoam beads and paper fiber which result in the desired channel voids are present in the composition until they are burned away. In contrast to voids caused by air bubbles generated by the action of a foaming agent, the ultimate amount of void space resulting from the beads and fiber is not affected by mere stirring of the composition during the mixing stage of its preparation.

Different refractory compositions according to the present invention, suitable for different modes of application, have different densities. Thus, gunnable and sprayable compositions prepared according to this invention have final applied dry bulk densities on the order of 95–110 lbs/ft$^3$, while trowellable compositions prepared according to this invention have final applied dry bulk densities on the order of 80–95 lbs/ft$^3$. The different consistencies for optimum adherence at time of application for the different types of compositions, and their resulting final dry bulk densities are controlled both by regulation of their water content at time of application, and by adjusting their composition at time of mixing according to the mode of application to be used. It has been discovered that certain compositions within the overall ranges encompassed by this invention are preferable for each mode of application. Thus, it has been found that for gunnable and sprayable compositions, the preferred level of paper fiber content (coarse fiber) is around 1.0 weight percent of the total composition and the preferred styrofoam bead (Type #2 bead) level is around 0.5 weight percent of the total composition. Similarly, for trowellable compositions, the preferred levels are 0.8 weight percent for paper fiber and 0.2 weight percent for styrofoam beads, respectively.

Refractory compositions made according to this invention, for all modes of application, demonstrate excellent thermal properties including rapid heat up without spalling and low thermal conductivity and high impact strength at elevated temperature.

The low thermal conductivity refractory compositions made according to the present invention enables them to act as good insulators. For example, when used to form the disposable refractory lining of a tundish, compositions of the present invention allow less heat transfer from the molten material poured into the tundish to the permanent lining of the tundish, than occurs with refractory compositons not containing styrofoam beads and paper fiber. This insulating property of disposable linings made from refractory compositons of the present invention protects the permanent tundish lining and extends its service life.

EXAMPLES

The refractory compositions of the present invention, their formulation and their use can be further understood from the following non-limiting examples. Additional examples of compositions and uses, within the scope of the claims, will be evident to those skilled in the art. Refractory compositions according to the present invention were prepared utilizing the following materials:

Refractory—Natural magnesia (MgO)
Homogenizer—Paper fiber, coarse—average fiber length approx. 1.25 mm; fine—average fiber length approx. 0.3 mm
Styrofoam Beads—Type #1, expanded from polystyrene beads, having particle sizes ranging from 1.2 mm to 3.0 mm; and Type #2, expanded from polystyrene beads, having particle sizes ranging from 0.6 mm to 1.2 mm.

EXAMPLE 1

Preparation of Samples—Casting, Drying and Firing

The ingredients were first mixed with the desired water content (20–25%) and thoroughly mixed in a planetary paddle type electric mixer for from 1–5 minutes. The mixture was then cast into a steel mold to make standard 9"×2"×2" bars. The cast bars were then air set for 24 hours, dried at 220° F.–230° F. for 24 hours and finally fired at 2,000° F. for 5 hours or 2,500° F. for 3 hours.

EXAMPLE 2

Gunnable and sprayable refractory compositions having the following components and containing varying amounts and types of styrofoam beads and paper fiber were prepared according to the method of Example 1.

| Component | Weight Percent |
| --- | --- |
| Magnesia/Silica | Balance |
| Sodium silicate | 3.5 |
| Bentonite | 2.0 |
| Tartaric acid | 1.2 |
| Sodium sulfate | 1.0 |
| Methyl cellulose | 0.01 |
| Paper fiber | 0.1-5.0 |
| Styrofoam beads | 0.01-2.0 |

EXAMPLE 3

A gunnable and sprayable refractory composition containing 1.0 weight percent coarse paper fiber and 0.5 weight percent Type #2 styrofoam beads, with the remaining components being as in Example 2, was prepared according to the method of Example 1.

EXAMPLE 4

Trowellable refractory compositions having the following components and containing varying amounts and types of styrofoam beads and paper fiber were prepared according to the method of Example 1.

| Component | Weight Percent |
| --- | --- |
| Magnesia/Silica/Alumina | Balance |
| Ball clay | 3.0 |
| Sodium silicate | 0.5 |
| Calcium lignosulphonate | 0.5 |
| Monosodium phosphate | 0.3 |
| Tartaric acid | 0.2 |
| Sodium sulfate | 0.2 |
| Carboxymethyl cellulose | 0.05 |
| Sodium lauryl sulfate | 0.001-0.2 |
| Paper fiber | 0.1-5.0 |
| Styrofoam beads | 0.01-2.0 |

EXAMPLE 5

A trowellable refractory composition containing 0.8 weight percent coarse paper fiber, 0.2 weight percent Type #2 styrofoam beads and 0.01 weight percent sodium lauryl sulfate, with the remaining components being as in Example 4 was prepared according to the method of Example 1.

EXAMPLE 6

Effect on Refractory Compositions of the Addition of Styrofoam Beads and Paper Fiber Comparative samples of refractory compositions according to the present invention were prepared containing various combinations of grades and amounts of styrofoam beads.

Table 1 shows the properties of the refractory composition modified by the addition of various amounts of the beads. The values shown are averages of measurements made on 3 to 4 cast bars.

Increasing the bead content had a significant effect on the resulting density of the refractory composition after drying or firing.

Table 1 shows that the density of the refractory composition decreased from 128 to 85 lbs/ft$^3$ after drying at 220° F., as the Type #1 styrofoam bead content was increased from 0 to 0.7 weight percent. Similar results were obtained by the addition of Type #2 styrofoam beads. The density of the refractory composition was further reduced by firing the material at 2,000° F.; e.g. 95 lbs/ft$^3$ (220° F.) reduced to 90 lbs/ft$^3$ (2,000° F.) at a 0.5 weight percent Type #1 bead content. The linear dimensional growth obtained after firing at 2,000° F. for 5 hours confirmed this. Increasing the styrofoam bead content slightly increased the amount of expansion (+0.4% for refractory composition with 0.5 weight percent Type #1, versus only +0.1% for refractory composition with no styrofoam bead content).

The linear dimensional growth was attributed to gas expansion in the composition during firing. The styrofoam beads shrank after drying at 220° F. and gradually disappeared after being heated to above 590° F. The gas generated by vaporization of the styrofoam beads further increased the extent of thermal expansion of the refractory composition.

The effect of bead size on the resulting density after drying at 220° F. was not significant. In samples of refractory compositions containing Type #2 beads, the cast bars were heated to 2,500° F. for 3 hours. The density after firing (2500° F./3 hours) was only slightly lower than that after drying at 220° F.

Table 2 shows that linear shrinkage was observed in all samples after firing at 2,500° F. for 3 hours. When the firing temperature was raised from 2,000° to 2,500° F., thermal growth resulting from gas expansion was overtaken by shrinkage caused by densification mechanisms.

Because the styrofoam beads are much less dense that the balance of the refractory material, an increase in the bead content caused an increase in the degree of segregation during mixing. The segregation problem was more severe when the coarser Type #1 bead was used instead of the finer Type #2 bead. The small beads were observed to have a slower flowability during mixing than the coarser beads. A decrease in the bead particle size increased the uniformity of the pore distribution which resulted in an increase in physical strength of the refractory composition. In summary, modifying the refractory composition by adding styrofoam beads with a fine particle size distribution was more beneficial than adding coarser beads.

Table 3 shows a comparison of the mechanical properties of refractory compositions, both unmodified and modified by the addition of Type #2 styrofoam beads, and, in some cases, further modified by the addition of paper fiber. Type #2 styrofoam beads were utilized in view of the prior determination that the finer particle size of this grade was more desirable.

The mechanical properties determined were cold modulus of rupture (CMOR) and cold crushing strength (CCS). Determinations were made after firing at 2,500° F. for 3 hours. Values in Table 3 are averages of measurements made on 3 to 6 cast bars.

Both CMOR and CCS decreased as the bead content increased. CMOR decreased from 387 psi (0% beads) to 220 psi (0.5% beads) to 201 psi (0.7% beads). When the refractory compositions were fired at 2500° F for 3 hours, the beads were completely burned off creating spherical voids of similar sizes. Increasing the bead content resulted in an increase in porosity of the material and a decrease in CMOR and CCS.

TABLE 1

Physical Properties of Modified Refractory Composition Containing Styrofoam Beads

| Bead Type (Wt. %) | | Refractory Composition Density (Lbs/Ft³) | | | Linear Dimensional Change (%) | |
|---|---|---|---|---|---|---|
| #1 | #2 | A | B | C | B | C |
| — | — | 128 | 120 | 127 | +0.1 | −0.7 |
| 0.2 | — | 111 | 107 | — | +0.2 | — |
| 0.35 | — | 102 | 97 | — | +0.2 | — |
| 0.50 | — | 95 | 90 | — | +0.4 | — |
| 0.70 | — | 85 | 81 | — | +0.4 | — |
| — | 0.2 | 114 | — | 113 | — | −1.1 |
| — | 0.35 | 104 | — | 103 | — | −1.2 |
| — | 0.50 | 96 | — | 94 | — | −1.0 |
| — | 0.70 | 87 | — | 85 | — | −0.8 |
| 0.10 | 0.20 | 106 | — | 105 | — | −1.2 |
| 0.20 | 0.10 | 106 | — | 105 | — | −1.2 |

A = properties measured after drying at 220° F./24 hours
B = properties measured after drying at 2000° F./5 hours
C = properties measured after drying at 2500° F./3 hours

TABLE 2

Physical Properties of Refractory Compositions With and Without Styrofoam Beads At Various Levels of Paper Fiber Content

| Styrofoam Bead (Wt. %) Type | | Total Paper Fiber (Wt. %) | Density (lbs/ft³) | | | Linear Dimensional Change (%) | |
|---|---|---|---|---|---|---|---|
| #1 | #2 | | A | B | C | B | C |
| — | — | 1.5 | 118 | 112 | — | +0.2 | — |
| 0.2 | — | 1.5 | 106 | 99 | — | +0.2 | — |
| 0.35 | — | 1.5 | 98 | 93 | — | +0.4 | — |
| 0.50 | — | 1.5 | 92 | 97 | — | +0.4 | — |
| — | — | 2.0 | 116 | 108 | — | +0.1 | — |
| — | 0.2 | 1.5 | 107 | — | 109 | — | −1.3 |
| — | 0.5 | 1.25 | 94 | — | 94 | — | −1.0 |
| — | 0.7 | 1.25 | 87 | — | 87 | — | −0.9 |

TABLE 3

Mechanical Properties of Gunnable Refractory Composition Containing Styrofoam Beads And/or Paper Fiber

| Styrofoam Beads, Type #2 (Wt. %) | Paper Fiber, Coarse (Wt. %) | CMOR | | CCS | |
|---|---|---|---|---|---|
| | | Load (lbs) | PSI | Load (lbs) | PSI |
| — | 1.0 | 260 | 387 | 4518 | 777 |
| 0.20 | 1.0 | 207 | 304 | 3159 | 544 |
| 0.35 | 1.0 | 176 | 254 | 2867 | 493 |
| 0.50 | 1.0 | 145 | 220 | 2078 | 360 |
| 0.70 | 1.0 | 132 | 201 | 1706 | 296 |
| 0.50 | 1.25 | 130 | 196 | 1932 | 340 |
| 0.70 | 1.25 | 94 | 148 | 1517 | 262 |

Incorporation of an additional 0.5 wt. % (total 1.5 wt. %) paper fiber in a conventional natural Magnesia-containing refractory composition without styrofoam beads reduced the density of the material, after drying at 220° F. from 128 to 118 lbs/ft³. The addition of paper fiber to refractory compositions according to the present invention, containing styrofoam beads of Types #1 or #2 in varying amounts, resulted in a further decrease in product density. All of the refractory compositions according to the present invention in this example were based on natural MgO.

The effect on density of variation in the paper fiber content of compositions with and without styrofoam beads is shown in Table 2.

At a content of 1.5% paper fiber and 0.5% Type #1 styrofoam beads, the composition had a density of 92 lbs/ft³. An increase in the total paper fiber content from 1.5 to 2.0% in a composition without styrofoam beads did not significantly reduce the density after drying at 220° F. (118 lbs/ft³ at 1.5 wt. % paper fiber to lbs/ft³ at 2.0 wt % paper fiber).

In conclusion, while the addition of paper fiber contributed to a reduction of the density of the refractory material, the effect was not as pronounced as produced by the addition of the styrofoam beads.

All paper fiber was burned off creating voids after firing at 2,500° F. for 3 hours. The voids were irregularly shaped compared to the spherical pores created by the styrofoam beads. Increasing the paper fiber content did however result in a reduction of the composition's CMOR and CCS values.

Gunnability of refractory compositions was good. For example, a composition containing 0.5 wt. % Type #2 styrofoam and 0.5 wt. % paper fiber, having a density of 92 lbs/ft³ after drying exhibited good gunning properties. At higher paper fiber content, however, the flow characteristics of the composition in transferring from the cement mixer to the hopper and from the hopper to the gunning apparatus became poor. It is most preferable to maintain the total paper fiber content at 1.25 wt. percent or less.

EXAMPLE 7

Performance Comparison of Gunnable Refractory Compositions

Conventional refractory composition without styrofoam beads, as well as refractory compositions according to the present invention, containing styrofoam beads at the 0.35, 0.5 and 0.7 wt. percent levels and having a paper fiber content of from about 1.25 to 1.5 wt. percent, as in Example 6, were tested by gunning onto a preheated (550° F.) lab tundish. The tundish was then rapidly fired to 1,800° F. No spalling, popping or peeling was observed on any of the styrofoam bead and paper fiber containing samples. In contrast, spalling was observed in the refractory composition samples containing paper fiber but not containing styrofoam beads.

Gunnability of refractory composition containing up to 0.7 wt. percent of Type #2 styrofoam beads was good, with the composition demonstrating good adherence and no rebound. Gunnability of refractory compositions containing the finer Type #2 bead was generally better then that of refractory compositon containing the coarser Type #1 bead.

The resistance to steel and slag penetration at 3,000° F. of both a conventional refractory composition with no styrofoam bead content and of refractory compositions according to the present invention with styrofoam bead contents of 0.5 and 0.7 wt. percent was investigated.

Measurement of steel and slag penetration at the elevated temperature was accomplished by the static slag cup test. The refractory compositions were first cast into a steel mold 9" long by 4" wide, with a plastic cup at the center. The total depth of the cast brick was approximately 3". The centered plastic cup was then removed after air setting to leave a cavity of 3" in diameter by 1½" depth. The cast bricks were then dried at 220° F. for 24 hours. The center cavity was then filled with 50–75 grams of steel washers and 50–75 grams of basic type slag ($CaO/SiO_2$). The bricks were then fired at 3,000° F. for 0.5 hour. The samples were then cooled and sectioned into 2 halves to evaluate the penetration distance.

The penetration depth of the slag and steel was similar between the material with and without styrofoam beads. However, the penetration depth increased slightly as the bead content became higher than 0.5 weight percent.

In an actual tundish heat generated by the molten metal is transferred through the tundish coating and linings to the outside shell. This causes the formation of a downward temperature gradient from the inside to the outside of the tundish. It is believed that that the molten slag or steel solidifies at the corresponding depth having a temperatue lower than the solidus temperature of the slag or steel. The solidified slag or steel than acts as a barrier to further penetration.

The addition of styrofoam beads and paper fiber to the refractory composition in the indicated percentages was also observed to result in improved deskullability properties of the refractory composition. This is believed to be due to the lower strength of the bead and paper fiber-containing compositions, compared to samples not containing beads and fiber, with respect to their performance in the steel and slag penetration test.

We claim:

1. A refractory composition comprising a refractory aggregate material selected from the group consisting of magnesia, alumina, calcia, silica and combinations thereof, and amounts of styrofoam beads and paper fiber in combination, such that the amounts of styrofoam beads and paper fiber are effective to respectively produce a homogeneous distribution of substantially spheroidal voids and interconnecting channels in the composition for the selected refractory aggregate material; with the voids and channels having a size which eliminates the occurrence of explosive spalling in the composition when it is heated to temperatures above the boiling point of water and the combustion temperatures of said styrofoam beads and paper fiber; the occurrence of explosive spalling being eliminated by allowing steam generated from water utilized in the mixing of the composition for application to a surface, and gases generated by the combustion of said styrofoam beads and paper fiber during said heating, which causes the formation of said voids and channels, to escape from the composition through said voids and channels, while not allowing the ingress of any external material with which the refractory composition is in contact.

2. The refractory composition according to claim 1 wherein the styrofoam beads are from about 0.01 to about 2.0 weight percent of the total composition, and the paper fiber is from about 0.1 to about 5.0 weight percent of the total composition.

3. The refractory composition according to claim 1 further comprising at least one additional component selected from the group consisting of:
a binder in an amount of from 0.0 to about 6.0 weight percent of the total composition;
a plasticizer in an amount of from 0.0 to about 10.0 weight percent of the total composition;
a bond stabilizer in an amount of from 0.0 to about 5.0 weight percent of the total composition;
a wetting agent in an amount of from 0.0 to about 1.0 weight percent of the total composition; and
a foaming agent in an amount of from 0.0 to about 0.5 weight percent of the total composition.

4. The refractory composition according to claim 1 wherein the styrofoam beads have particle sizes ranging from about 0.6 mm to about 3.0 mm.

5. The refractory composition according to claim 4 containing from 0 to about 2.0 weight percent of first styrofoam beads having particle sizes ranging from about 1.2 mm to about 3.0 mm and from 0 to about 2.0 weight percent of second styrofoam beads having particle sizes ranging from about 0.6 mm to about 1.2 mm, such that at least one of first and second styrofoam beads are present and the total amount of first and second styrofoam beads is from about 0.01 to about 2.0 weight percent.

6. The refractory composition according to claim 4 wherein the styrofoam beads have a bulk density of about 1.35 lbs/ft$^3$, a melting temperature of about 460° F., and a vaporization temperature of about 540° F.

7. The refractory composition according to claim 6 wherein the styrofoam beads are expanded polystyrene beads.

8. The refractory composition according to claim 1 wherein the paper fiber has fiber lengths of from about 0.1 mm to about 1.5 mm.

9. The refractory composition according to claim 8 wherein the paper fiber is selected from the group consisting of first paper fibers having fiber lengths of from about 0.1 mm to about 0.5 mm, and second paper fibers having fiber lengths of from about 1.0 mm to about 1.5 mm, with the selected paper fibers being present in an amount of from 0.0 to 5.0 weight percent.

10. The refractory composition according to claim 1 wherein the binder is selected from the group consisting of alkali metal silicates, alkali metal phosphates and combinations thereof.

11. The refractory composition according to claim 10 wherein the binder is selected from the group consisting of sodium silicate, monosodium phosphate, and sodium phosphate.

12. The refractory composition according to claim 3 wherein the plasticizer is a clay.

13. The refractory composition according to claim 12 wherein the clay is selected from the group consisting of bentonite, ball clay and mixtures thereof.

14. The refractory compositon according to claim 1 wherein the bond stabilizer is at least one of an organic acid and an alkali metal sulfate.

15. The refractory composition according to claim 14 wherein the organic acid is an aliphatic di- or tri-carboxylic acid.

16. The refractory composition according to claim 15 wherein the organic acid is selected from the group consisting of tartaric, citric, oxalic and malic acids, and combinations thereof.

17. The refractory composition according to claim 14 wherein the alkali metal sulfate is sodium sulfate.

18. The refractory composition according to claim 1 wherein the wetting agent is a poly-oxyethylene alkylate ether.

19. The refractory composition according to claim 18 wherein the wetting agent is selected from the group consisting of methyl cellulose, carboxy methyl cellulose and mixtures thereof.

20. The refractory composition according to claim 1 wherein the foaming agent is sodium lauryl sulfate.

21. The refractory composition according to claim 1 which is appliable by means selected from the group consisting of gunning, spraying and trowelling.

22. A gunnable or sprayable refractory composition comprised by the formulation:

| Component | Weight Percent |
|---|---|
| Magnesia/Silica | Balance |
| Styrofoam beads | 0.01–2.0 |
| Paper fiber | 0.01–5.0 |
| Sodium silicate | 3.5 |
| Bentonite | 2.0 |
| Tartaric acid | 1.2 |
| Sodium sulfate | 1.0 |
| Methyl cellulose | 0.01 |

23. The gunnable or sprayable refractory composition according to claim 22 wherein the styrofoam beads have a particle size ranging from about 0.6 mm to about 1.2 mm and are present in the amount of 0.5 weight percent; and the paper fiber has fiber lengths of from about 1.0 mm to abut 1.5 mm and is present in the amount of 1.0 weight percent.

24. A trowellable refractory composition comprised by the formulation:

| Component | Weight Percent |
|---|---|
| Magnesia/Silica/Alumina | Balance |
| Styrofoam beads | 0.01–2.0 |
| Paper fiber | 0.1–5.0 |
| Ball clay | 3.0 |
| Sodium silicate | 0.5 |
| Calcium lignosulphonate | 0.5 |
| Monosodium phosphate | 0.3 |
| Tartaric acid | 0.2 |
| Sodium sulfate | 0.2 |
| Carboxy methyl cellulose | 0.05 |
| Sodium lauryl sulfate | 0.001–0.2 |

25. The trowellable refractory composition according to claim 24 wherein the styrofoam beads have a particle size ranging from about 0.6 mm to about 1.2 mm and are present in the amount of 0.2 weight percent; the paper fiber has fiber lengths of from about 1.0 mm to about 1.5 mm and is present in the amount of 0.8 weight percent; and the sodium lauryl sulfate content is 0.01 weight percent.

26. A method of forming a disposable monolithic refractory lining for a vessel, such as a tundish and the like, comprising gunning or spraying onto the inner surfaces of said vessel a refractory composition containing from 0.01 to 2.0 weight percent styrofoam beads, from 0.01 to 5.0 weight percent paper fiber, 3.5 weight percent sodium silicate, 2.0 weight percent bentonite, 1.2 weight percent tartaric acid, 1.0 weight percent sodium sorbate, and 0.01 weight percent methyl cellulose, with the balance to total 100 weight percent being refractory aggregate selected from the group consisting of magnesia and silica.

27. A method of forming a disposable monolithic refractory lining for a vessel, such as tundish and the like, comprising trowelling onto the inner surfaces of said vessel a refractory composition containing from 0.01 to 2.0 weight percent styrofoam beads, from 0.01 to 5.0 weight percent paper fiber, 3.0 weight percent ball clay, 0.5 weight percent sodium silicate, 0.5 weight percent calcium lignosulphonate, 0.3 weight percent monosodium phosphate, 0.2 weight percent tartaric acid, 0.2 weight percent sodium sorbate, 0.05 weight percent carboxymethylcellulose, and from 0.001 to 0.2 weight percent sodium lauryl sulfate, with the balance to total 100 weight percent being refractory aggregate selected from the group consisting of magnesium, silica and alumina.

* * * * *